United States Patent
Raines et al.

(10) Patent No.: US 9,067,566 B1
(45) Date of Patent: Jun. 30, 2015

(54) ACTIVE BOLSTER FOR PEDESTRIAN PROTECTION

(71) Applicant: FORD GLOBAL TECHNOLOGIES, LLC, Dearborn, MI (US)

(72) Inventors: Stacey H. Raines, Ypsilanti, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/202,581

(22) Filed: Mar. 10, 2014

(51) Int. Cl.
*B60R 21/36* (2011.01)
*B60R 21/2165* (2011.01)
*B60R 21/205* (2011.01)
*B60R 21/00* (2006.01)

(52) U.S. Cl.
CPC .............. *B60R 21/36* (2013.01); *B60R 21/2165* (2013.01); *B60R 21/205* (2013.01); *B60R 2021/0048* (2013.01); *B60R 2021/003* (2013.01)

(58) Field of Classification Search
CPC B06R 21/36; B06R 21/205; B06R 2021/003; B06R 21/34
USPC ...................................... 180/274; 296/187.04
See application file for complete search history.

(56) References Cited

U.S. PATENT DOCUMENTS

| | | | |
|---|---|---|---|
| 7,543,677 B2 | 6/2009 | Igawa | |
| 7,584,988 B2 | 9/2009 | Okamoto et al. | |
| 8,002,307 B2 | 8/2011 | Schmierer | |
| 2007/0018440 A1* | 1/2007 | Reiter et al. | 280/732 |
| 2008/0136144 A1* | 6/2008 | Spahr et al. | 280/728.3 |
| 2010/0300793 A1 | 12/2010 | Hallnëus et al. | |
| 2013/0048405 A1* | 2/2013 | Okamoto et al. | 180/274 |
| 2013/0133971 A1* | 5/2013 | Rick | 180/274 |

FOREIGN PATENT DOCUMENTS

EP      1808364 B1    8/2011
WO   WO 2011010053 A1 *  1/2011

* cited by examiner

*Primary Examiner* — Karen Beck
(74) *Attorney, Agent, or Firm* — Vichit Chea; MacMillan, Sobanski & Todd, LLC

(57) ABSTRACT

A vehicle instrument panel has a pedestrian protection zone along a forward side. The instrument panel generally has a low stiffness that avoids impact forces in the pedestrian protection zone greater than a predetermined force. An accessory component mounted on the instrument panel within the protection zone has a stiffness that could generate an impact force above the predetermined force. A cover providing a trim surface of the instrument panel has an annular wall region between inner and outer tear seams which encompass the accessory component. An annular bladder wall joined to the annular wall region forms a substantially toroidal expandable chamber. An inflator is arranged to supply an inflation gas into the expandable chamber during an impact of a pedestrian to tear the tear seams and expand the expandable chamber above the instrument panel body to intercept the pedestrian prior to impacting the accessory component.

10 Claims, 4 Drawing Sheets

ACTIVE BOLSTER FOR PEDESTRIAN PROTECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to pedestrian protection systems in automotive vehicles, and, more specifically, to including rigid structures such as accessories on a vehicle instrument panel within a pedestrian protection zone while maintaining low impact forces to a pedestrian during an impact.

An important objective in the design of motor vehicles is to provide structural properties that limit the potential for injuries to pedestrians (e.g., walkers and cyclists) that may result from collisions with a vehicle. One important criteria for evaluating pedestrian impacts relates to the magnitude of impact forces generated when the head of a pedestrian impacts at various areas of the vehicle (referred to as a pedestrian protection zone). This zone may include the vehicle's hood over the engine compartment (i.e., bonnet) and the windshield. The zone corresponding to the windshield may require consideration of structures beneath the windshield such as a cowl and an instrument panel.

Voluntary guidelines and governmental regulations have specified target impact performance in terms of a head injury criteria (HIC) or a head performance criteria (HPC) at specified points in the pedestrian protection zone at the forward end of the vehicle. The target may be based upon the magnitude of acceleration experienced and the time over which it occurs as an estimate of the potential severity of injury. The potential for injury is proportional to the stiffness of vehicle structures coinciding with the protection zone. A structure with a lower stiffness that crumples (i.e., yields) more readily in response to an impactor creates a lower risk of injury than a structure with a higher stiffness since the higher stiffness generates a higher impact force against the impactor.

A typical pedestrian protection zone includes at least a forward portion of the windshield and structures beneath the windshield, which may typically include a forward edge of the instrument panel that is mounted within the passenger cabin. Historically, the forward edge of the instrument panel has tended to be relatively soft and has been lacking in stiff structures that caused issues for maintaining low impact forces. More recently, however, it has become desirable to relocate certain instrument panel components to a position on the instrument panel that is more forward. This relocation may be motivated by a desire to provide additional storage space within the instrument panel or to shrink the overall size of the instrument panel. Accessory components which may be moved into the protection zone include a passenger airbag module, a heads-up display, an audio speaker, and a defrost vent, for example. Consequently, respective portions of the instrument panel within the pedestrian protection zone may become stiffer, resulting in concerns about meeting pedestrian protection objectives.

Externally mounted air bag systems can be deployed to provide protection in the area of the windshield during a pedestrian impact. However, such systems are complex and expensive. A supplemental internal air bag system is generally not feasible because of the limited space available within the instrument panel and between the surface of the instrument panel and the windshield. It would be desirable to introduce "hard points" on an instrument panel within a pedestrian protection zone while maintaining pedestrian protection without requiring air bags.

SUMMARY OF THE INVENTION

Active plastic bolsters have been introduced wherein a gas-inflatable bladder absorbs impacts to reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or panel that faces a vehicle occupant attached to a base wall or panel along a sealed periphery. One or both of the walls is deformable in order to provide an inflatable bladder. For example, the base wall may have a pleated (i.e., accordion-like) region that straightens out during inflation. The walls are initially spaced apart by a small amount when in their pre-deployment, non-inflated condition. This allows ingress of the inflation gas in a manner that achieves even inflation across the panel.

The front and base walls of a typical active bolster are comprised of molded thermoplastics such as polyethylene, polyolefin, or PVC. They are typically injection molded. When formed separately, the front and base walls must be hermetically joined around their periphery in order to form the inflatable bladder.

Active bolsters have been placed into interior trim surfaces at specific positions on the instrument panel, doors, and seats where an interior passenger may impact during a crash. The present invention utilizes a similar active bolster structure that is instead placed adjacent to hard points on the top of an instrument panel to alter the effect stiffness at the hard points during incursion of a pedestrian into the pedestrian protection zone.

In one aspect of the invention, vehicle apparatus comprises an instrument panel body extending across a passenger cabin beneath a windshield and including a pedestrian protection zone along a forward side. The instrument panel body generally has a stiffness that is sufficiently low to avoid generating an impact force in the pedestrian protection zone greater than a predetermined force. An accessory component is mounted within the pedestrian protection zone at the instrument panel body having an associated stiffness that generates an impact force in the pedestrian protection zone greater than the predetermined force. A cover provides a trim surface over the instrument panel body at the pedestrian protection zone and has an annular wall region between an inner tear seam and an outer tear seam which encompass the accessory component. An annular bladder wall is joined to the annular wall region forming a substantially toroidal expandable chamber. An inflator is arranged to supply an inflation gas into the expandable chamber during an impact of a pedestrian into the pedestrian protection zone to tear the tear seams and expand the expandable chamber above the instrument panel body to intercept the pedestrian prior to impacting the accessory component.

DETAILED DESCRIPTION OF PREFERRED EMBODIMENTS

Figure 1:
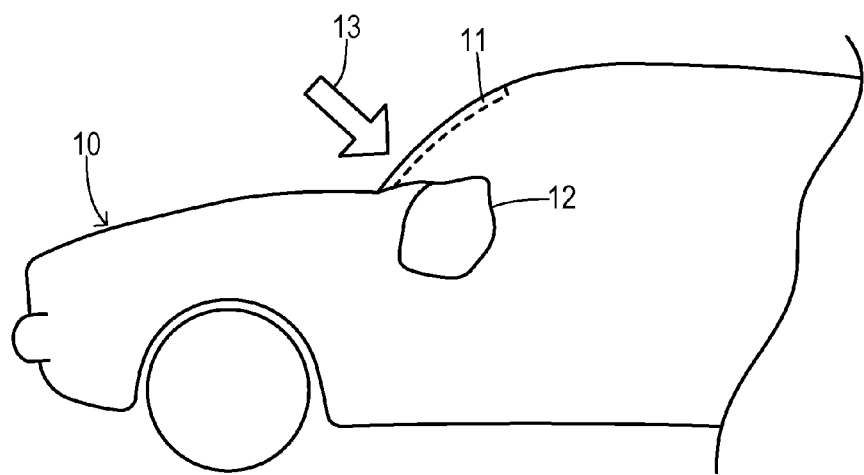
FIG. 1 is a side profile of a pedestrian protection zone coinciding with a windshield and instrument panel.
Figure 2:
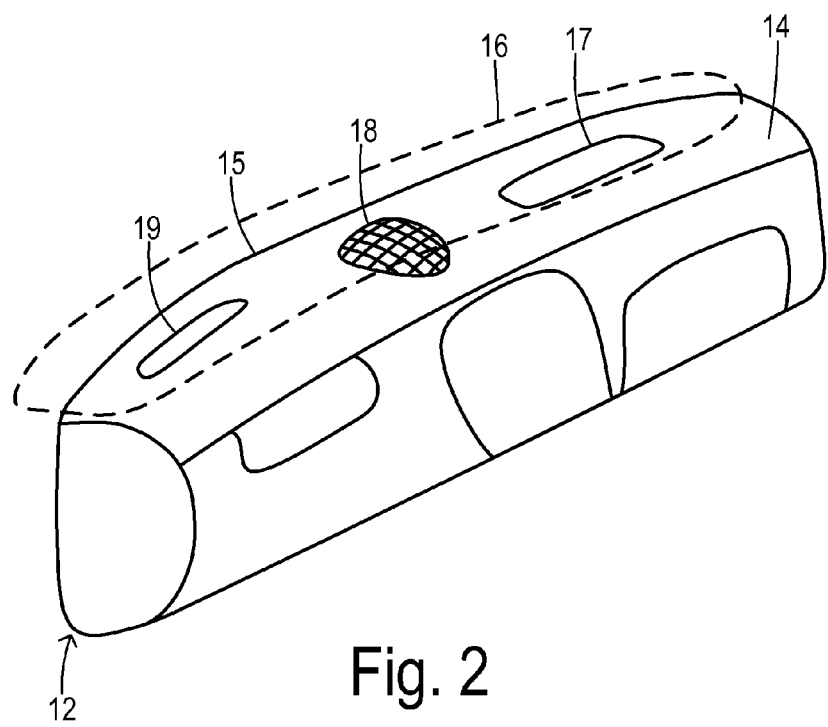
FIG. 2 is a perspective view showing an instrument panel with accessory components located within a pedestrian protection zone.

Referring to FIG. 1, a vehicle 10 includes a windshield or windscreen 11 disposed partially over an instrument panel 12 as seen in profile. An arrow 13 indicates a region where a pedestrian head impact may occur within a pedestrian protection zone defined to coincide with a lower end of windshield 11 and a forward portion of instrument panel 12. As shown in greater detail in FIG. 2, a pedestrian protection zone 16 coincides with a forward side 15 of a top or upper trim surface 14 of instrument panel 12. More specifically, pedestrian protection zone 16 includes forward side 15 all the way across the passenger cabin and beneath windshield 11 because an impacting pedestrian may penetrate windshield 11 and also impact forward side 15 of instrument panel 12.

Various accessory components such as a passenger airbag module 17, a speaker grille 18, and a heads-up display 19 may be mounted at the body of instrument panel 12 within pedestrian protection zone 16 which have a high stiffness. These hard points could, if impacted, impart an impact force to an impacting body greater than a predetermined force allowed by guidelines or regulations. Instrument panel 12 at top surface 14 generally has a stiffness that is sufficiently low to avoid generating any impact forces in zone 16 that are greater than the predetermined force. For example, in the regions of instrument panel 12 surrounding the hard points (i.e., accessory components), a plastic substrate and cover layer of panel 12 may typically provide sufficient impact absorption to meet the desired impact requirements. By locating the hard points of accessory components 17-19 within pedestrian protection zone 16, prior art techniques have found it difficult to meet the desired impact force properties.

Figure 3:
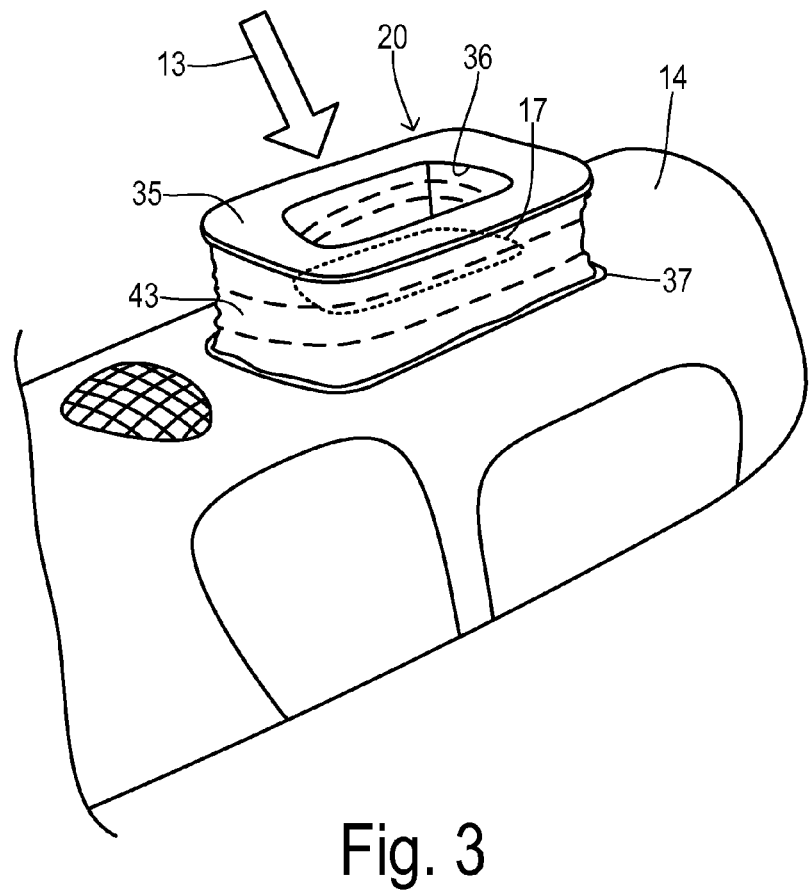
FIG. 3 is a perspective view of an instrument panel with an active bolster deployed around an accessory component.

As shown in FIG. 3, any accessory components such as passenger airbag module 17 may preferably be surrounded by an active bolster 20 that deploys according to a toroidal or "doughnut" shape that a) borders or encircles airbag module 17, and b) extends above top trim surface 14 in order to intercept an impacting pedestrian before any impact occurs with airbag module 17. Thus, a pedestrian following trajectory 13 is cushioned by active bolster 20 which absorbs the impact forces and decelerates the pedestrian before any interaction with airbag module 17. Pedestrian protection performance is obtained at the desired level even though various hard points are introduced on instrument panel top surface 14.

Figure 4:
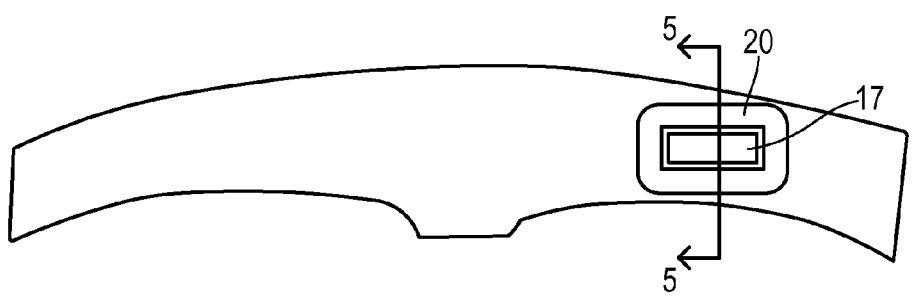
FIG. 4 is a top view of the instrument panel of FIG. 3.

As shown by FIGS. 3 and 4, active bolster 20 may fully annularly surround an accessory component (such as airbag module 17), which may be especially desirable when the entire accessory component lies within the pedestrian protection zone.

Figure 5:
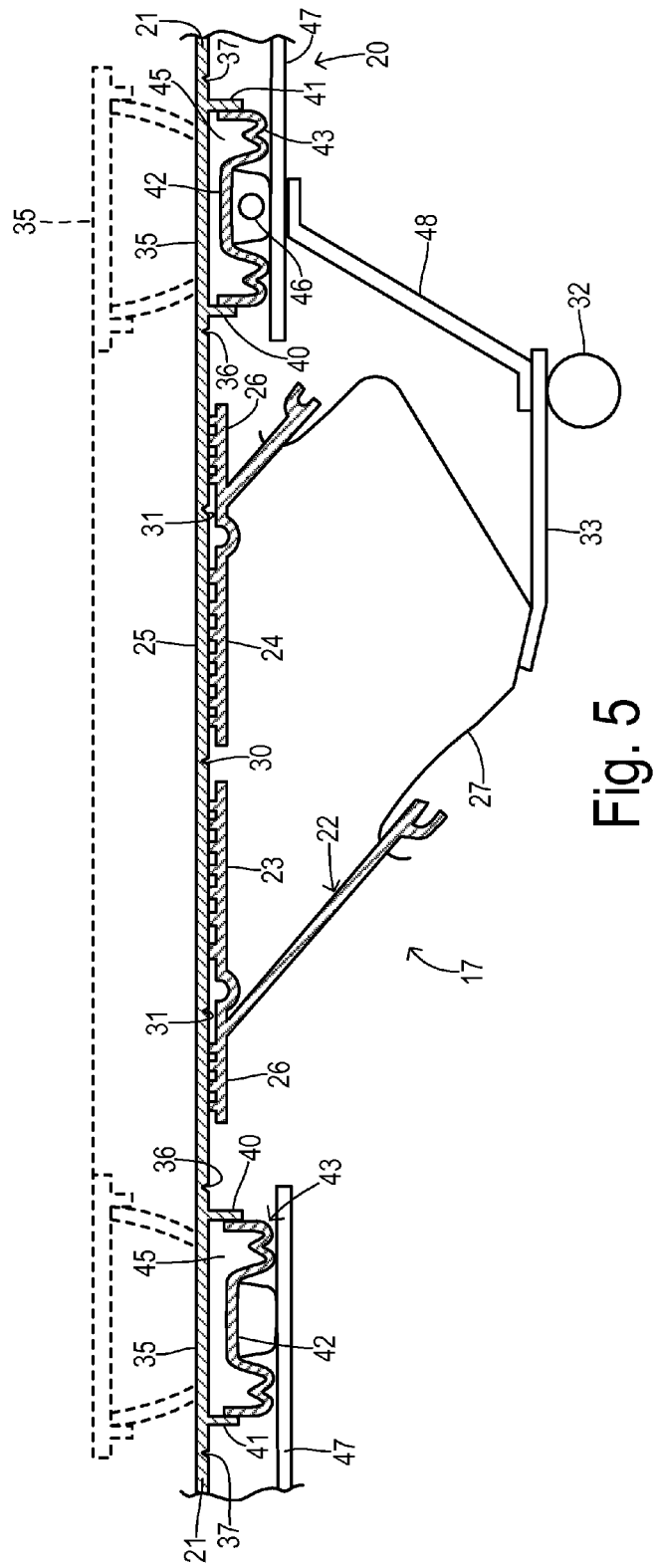
FIG. 5 is a cross-sectional view along lines 5-5 of FIG. 4.

FIG. 5 shows a cross-sectional view of bolster 20 and airbag module 17 taken along line 5-5 of FIG. 4. Instrument panel 12 has a cover layer 21 which may be formed of various plastics (such as PP) in order to provide a desired texture, color, and finish suitable for the trim surface of instrument panel 12. In addition, a skin or other outer layer may be provided over cover layer 21. As known in the art, an airbag module 17 may include a deployment chute 22 with hinged door panels 23 and 24 being welded (e.g., hot welded) to the bottom side of cover layer 21 at a door portion 25. A flange 26 around an outer periphery of chute 22 is also welded to the bottom side of cover layer 21. A frangible door is formed in cover layer 21 which can be torn open by deploying (i.e., inflating) an airbag from within a bag unit 27 as a result of tearing of a plurality of tear seams 30 and 31. Bag unit 27 is rigidly mounted to a cross car beam 32 by a support member 33. This is a rigid support that creates a high stiffness and causes passenger airbag module 17 to become a hard point on the surface of instrument panel 12.

Active bolster 20 is formed by an annular wall region 35 within cover layer 21 formed between an inner tear seam 36 and an outer tear seam 37. During deployment, annular wall region 35 expands upward above the upper trim surface of the instrument panel body into the position shown by dashed lines.

Cover layer 21 has an inner annular collar 40 and an outer annular collar 41 extending downward between tear seams 36 and 37. Collars 40 and 41 act as welding flanges for inner and outer edges of an annular bladder wall 42 to form a substantially toroidal expandable chamber 45. Annular bladder wall 42 preferably has a plurality of pleats 43 between its inner and outer edges in order to be expandable. An inflator 46 is mounted to active bolster 20 for producing an inflation gas which is coupled into chamber 45 during deployment. A fixed reaction surface 47 is disposed behind and against annular bladder wall 42 so that when inflation gas inflates chamber 45 then annular wall region 35 is forced upward—resulting in tearing along seams 36 and 37 and expansion of the bladder to the position shown by dashed lines. Reaction surface 47 may be a structural element mounted within the instrument panel and/or supported by a support member 48 which is coupled with cross car beam 32.

In the arrangement of FIG. 5, instrument panel cover layer 21 extends over the accessory components (e.g., airbag module 17) with no visible seams since each of the tear seams is located on the bottom side of cover layer 21. Pleats 43 extend angularly around the full circumference of bladder wall 42, and they unfold during expansion to the extended position shown in FIG. 3.

Figure 6:
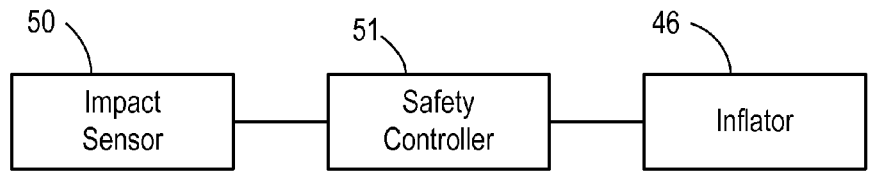
FIG. 6 is a block diagram showing a control system for an active bolster of the present invention.

An electronic control system for the invention is shown in FIG. 6. An impact sensor 50 uses known techniques for detecting the impact or potential impact of a pedestrian, including front-end mounted accelerometers and or remote sensors. Impact sensor 50 is coupled to a safety controller 51 for analyzing the sensor signals and determining whether the appropriate conditions exist in which an active bolster should be deployed in order to potentially protect a pedestrian about to collide in the pedestrian protection zone. When a pedestrian is sensed, safety controller 51 sends a signal to an inflator 46 to initiate deployment.

Figure 7:
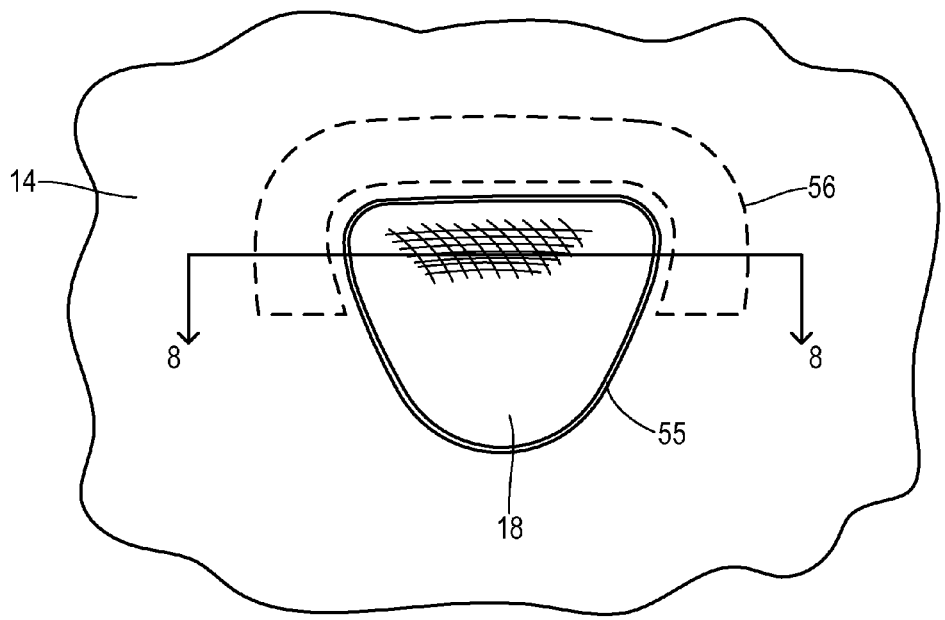
FIG. 7 is a top view of a second embodiment of an accessory component and an associated active bolster.

When the hard point created in the instrument panel upper trim surface corresponds to an accessory component not wholly contained within the pedestrian protection zone, then it may not be necessary to fully encompass the accessory component with a toroidally-shaped active bolster bladder. For example, in FIG. 7 an instrument panel top trim surface 14 is interrupted by a speaker grille 18. An aperture 55 in the cover layer is formed around speaker grille 18. A U-shaped active bolster 56 is arranged to border a portion of speaker grille 18 that lies within the pedestrian protection zone. By placing active bolster 56 adjacent to the accessory component (i.e., to border it at least along an edge falling in the pedestrian protection zone), bolster 56 inflates to deploy the bladder adjacent and above the speaker grille accessory component.

Figure 8:
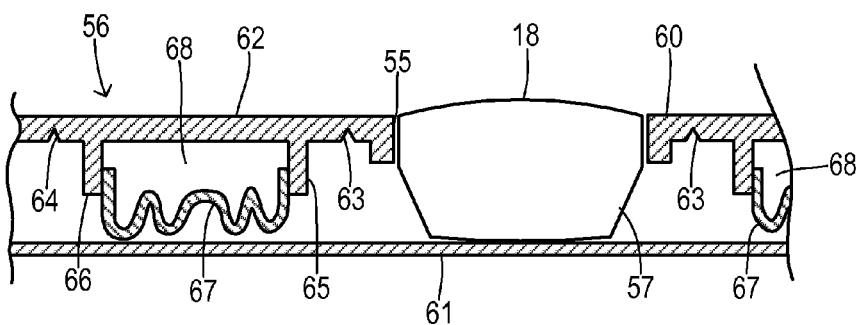
FIG. 8 is a cross section of the invention taken along line 8-8 in FIG. 7.

As shown in the cross-section of FIG. 8, speaker grille 18 may be part of a speaker assembly 57. Aperture 55 is formed within a cover layer 60 which forms a trim surface of the instrument panel. A reaction surface 61 rigidly supports speaker assembly 57 and an active bolster 56. Bolster 56 includes an annular wall region 62 between an inner tear seam 63 and an outer tear seam 64. Inner and outer flanges 65 and 66 provide attachment points for a pleated annular bladder wall 67, together forming an expandable chamber 68 which is substantially U-shaped in this particular embodiment. When an impact or potential impact event is detected with a pedestrian in the pedestrian protection zone, an inflator (not shown) is triggered in order to supply inflation gas into chamber 68 thereby expanding the active bladder and inflating the bladder adjacent and above the accessory component to intercept the pedestrian and prevent contact with the accessory component or speaker grille 18.

What is claimed is:

1. Vehicle apparatus, comprising:
    an instrument panel body extending across a passenger cabin beneath a windshield and including a pedestrian protection zone along a forward side, wherein the instrument panel body generally has a stiffness that is sufficiently low to avoid generating an impact force in the pedestrian protection zone greater than a predetermined force;
    an accessory component mounted within the pedestrian protection zone at the instrument panel body having an associated stiffness that generates an impact force in the pedestrian protection zone greater than the predetermined force;
    a cover providing a trim surface over the instrument panel body at the pedestrian protection zone having an annular wall region between an inner tear seam and an outer tear seam which encompass the accessory component;
    an annular bladder wall joined to the annular wall region forming a substantially toroidal expandable chamber;
    an inflator arranged to supply an inflation gas into the expandable chamber during an impact of a pedestrian into the pedestrian protection zone to tear the tear seams and expand the expandable chamber above the instrument panel body to intercept the pedestrian prior to impacting the accessory component.

2. The apparatus of claim 1 wherein the cover extends over the accessory component with no visible seams.

3. The apparatus of claim 2 wherein the accessory component is comprised of a passenger air bag assembly.

4. The apparatus of claim 1 wherein the cover extends to an outer edge of the accessory component.

5. The apparatus of claim 1 wherein the bladder wall has annular pleats prior to being expanded.

6. The apparatus of claim 5 further comprising a rigid reaction surface disposed beneath the bladder wall.

7. Apparatus protecting a pedestrian in an impact with a vehicle, comprising:
    an instrument panel in the vehicle;
    a passenger airbag module assembled to the instrument panel within a pedestrian protection zone; and
    an active bolster bordering the passenger airbag module to deploy an inflated bladder adjacent and above the passenger airbag module in the pedestrian protection zone to intercept the pedestrian.

8. The apparatus of claim 7 wherein the instrument panel includes a cover layer extending over the passenger airbag module and the active bolster, and wherein the cover layer includes a plurality of tear seams defining a deployment door for the passenger airbag module and a wall for an upper surface of the bladder.

9. Apparatus protecting a pedestrian in an impact with a vehicle, comprising:
    an instrument panel in the vehicle with a cover layer;
    an accessory component assembled to the instrument panel presenting a stiffness resulting in potential injury to the pedestrian; and
    an active bolster bordering the accessory component to deploy an inflated bladder adjacent and above the accessory component by tearing a portion of the cover layer during expansion to intercept the pedestrian.

10. The apparatus of claim 9 wherein the active bolster encircles the accessory component, and wherein the torn portion of the cover and the inflated bladder are disposed annularly around the accessory component.

* * * * *